United States Patent [19]
Oishi et al.

[11] 3,941,914
[45] Mar. 2, 1976

[54] DAMPER FOR AN OVERHEAD TRANSMISSION LINE

[75] Inventors: Masanori Oishi; Harusige Koyanagi; Kazuo Matsumoto, all of Nikko, Japan

[73] Assignee: The Furukawa Electric Co., Ltd., Tokyo, Japan

[22] Filed: May 30, 1975

[21] Appl. No.: 582,159

[30] Foreign Application Priority Data
May 31, 1974  Japan.............................. 49-61637
Apr. 1, 1975  Japan.............................. 50-38538

[52] U.S. Cl. ................................................ 174/42
[51] Int. Cl.² ......................................... H02G 7/14
[58] Field of Search ....................................... 174/42

[56] References Cited
UNITED STATES PATENTS
2,999,894   9/1961   Binder ................................. 174/42
3,778,527   12/1973  Nigol ................................... 174/42

FOREIGN PATENTS OR APPLICATIONS
611,556   3/1935   Germany .............................. 174/42
647,926   7/1937   Germany .............................. 174/42
466,024   5/1937   United Kingdom................... 174/42

*Primary Examiner*—Laramie E. Askin
*Attorney, Agent, or Firm*—Woodling, Krost, Granger & Rust

[57] ABSTRACT

A damper for an overhead transmission line comprising a torsional bar disposed in a spaced and parallel arrangement with conductor means of an overhead transmission line; a fixture spacer to fix one of the ends of said torsional bar to said conductor means of the overhead transmission line; at least one bearing spacer to bear the other end of said torsional bar on said conductor means of said overhead transmission line so that said torsional bar is allowed to be twisted; and a pair of weights having an equal inertia moment and secured to said torsional bar adjacent to the torsional end and on either side thereof.

16 Claims, 18 Drawing Figures

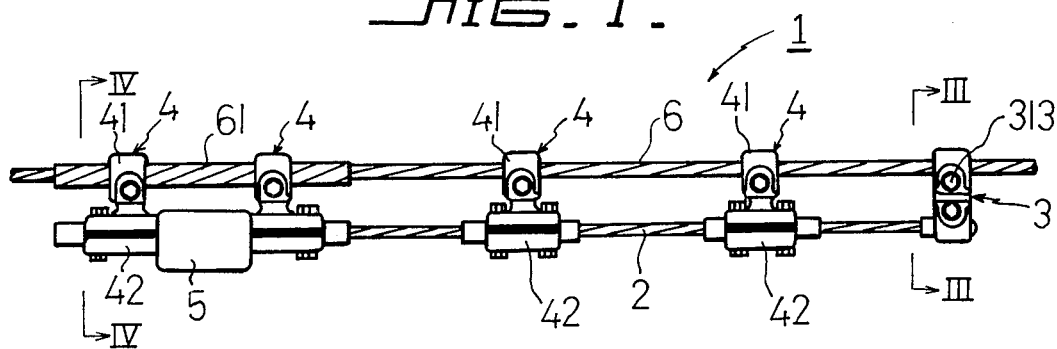
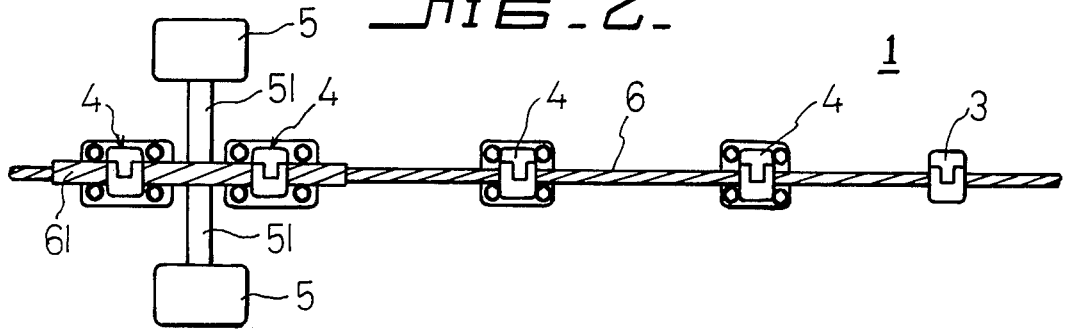
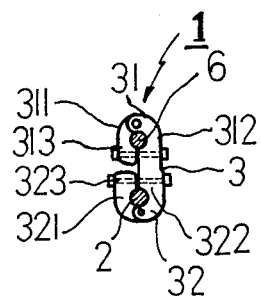
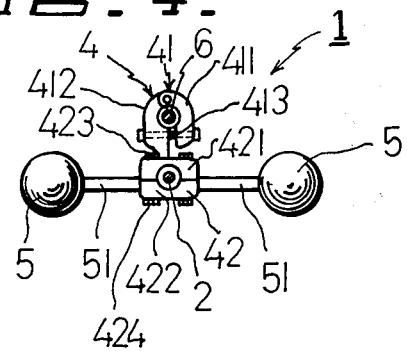

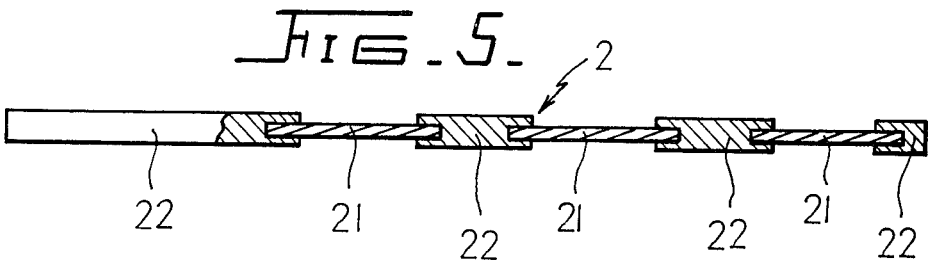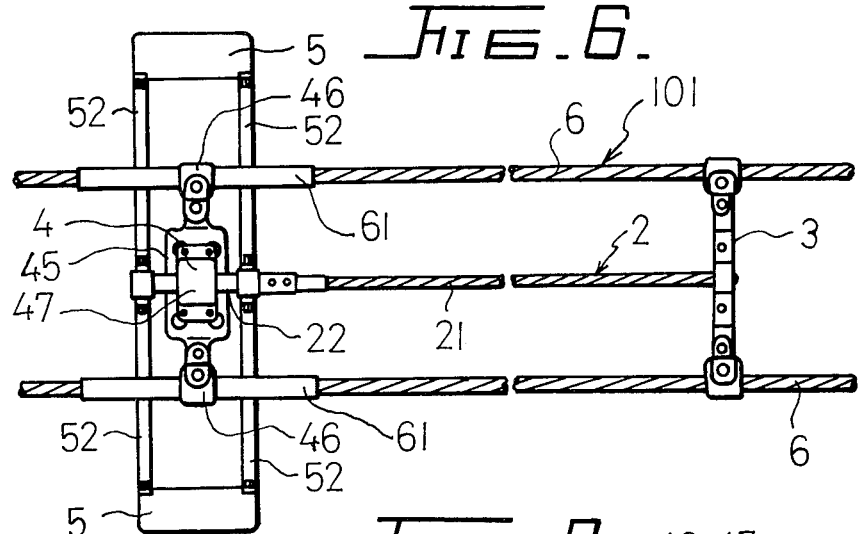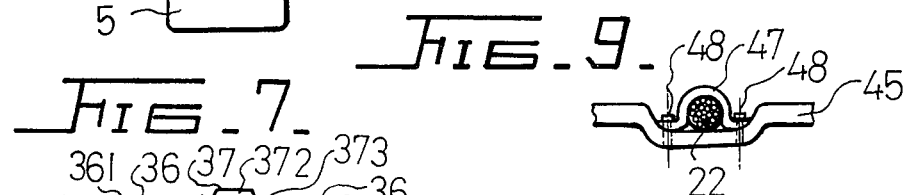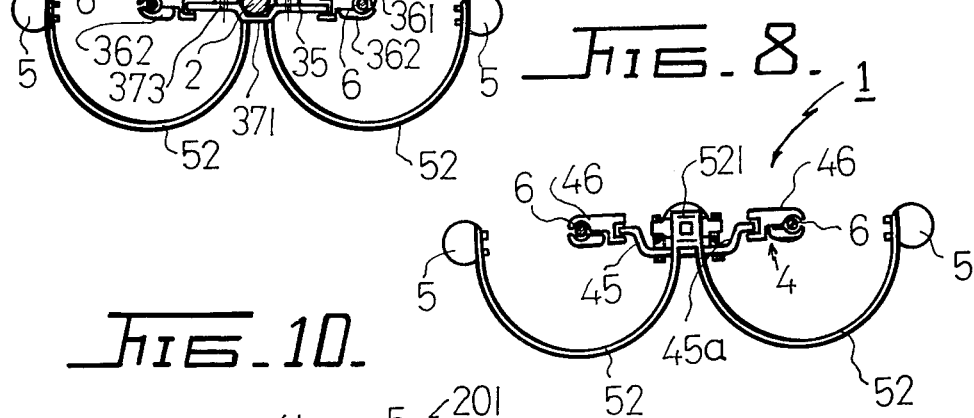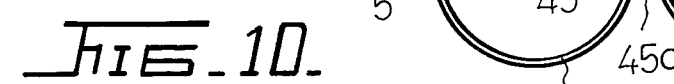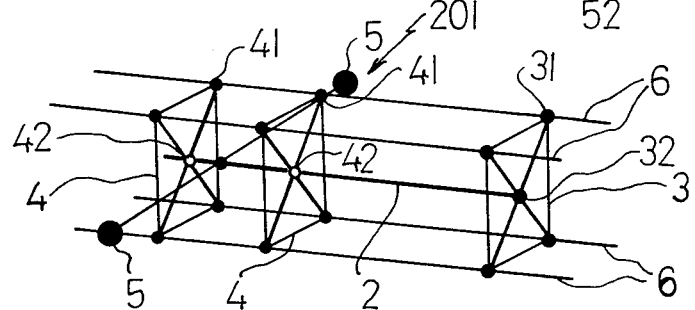

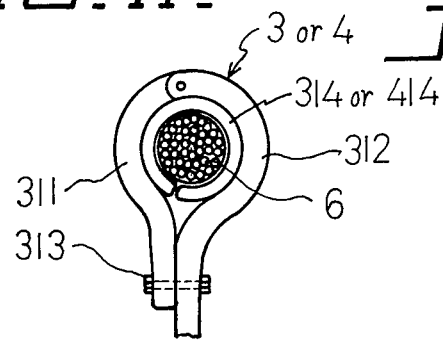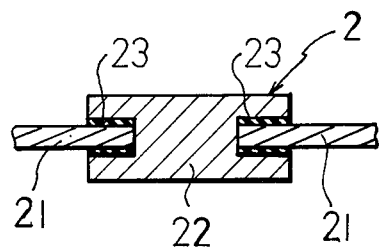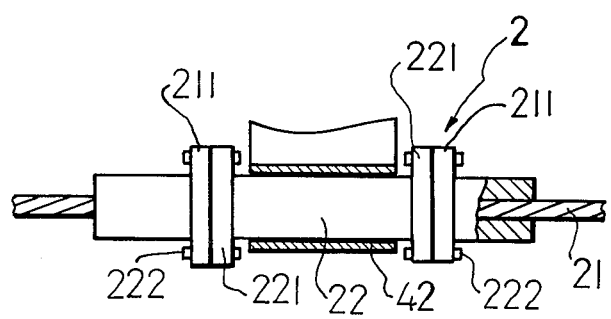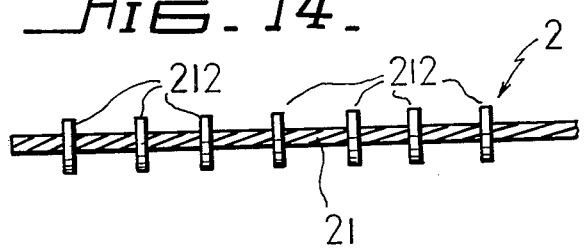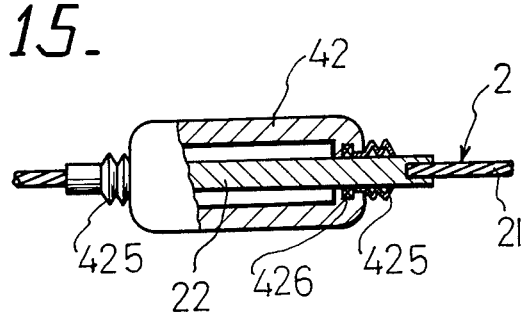

3,941,914

DAMPER FOR AN OVERHEAD TRANSMISSION LINE

FIELD OF THE INVENTION

This invention relates generally to a damper for an overhead transmission line, and more particularly to a damper for effectively damping or preventing a galloping of vibrations to which an overhead transmission line tends to be subject.

BACKGROUND OF THE INVENTION

Vibrations on an overhead transmission line are typically an aeolian vibration and a galloping. The aeolian vibration is one which is caused by Karman vortex behind the conductor or conductors of the transmission line (referred to as the conductor hereinafter) with respect to the direction of wind to vertically vibrate the conductor of the transmission line with high frequency (such as about 10 to 100 HZ) and with low amplitude (such as about 2cm). Such an aeolian vibration may be prevented by a well known device such as a Stockbridge damper, a torsional damper and a bate damper. On the other hand, the galloping vibration is one which is generally caused by ice and snow collecting on the conductor of the transmission line to vibrate them with low frequency (such as about 0.1 to 1 HZ) and with large amplitude (such as about a few centimeters to ten and extra meters) and such a vibration causes unfavorable accidents such as short-circuit between the phase conductors. The galloping cannot be prevented by the conventional device such as a Stockbridge damper, a torsional damper or a bate damper.

It has been found that the galloping tends to occur when the conductor of the transmission line with ice and snow thereon is blown by wind having the velocity of about 10 to 20 m/s and that it tends to be produced in a severer manner in case of a bundle conductor than in case of a single conductor of the transmission line. It has been also found that it tends to occur in a severer manner in the case of a light conductor such as steel reinforced aluminum conductor (ACSR) than in the case of a weighty conductor such as copper stranded conductor.

Of late, there has been a tendency to use an overhead transmission line of the bundle conductor type because of increased demand of electric power, and in many cases the transmission line has been constructed through a mountainous district which is topographically and meteorologically severe, because of difficulty to find a site to construct it. Thus, more and more transmission lines will exist which tend to produce a galloping. Accordingly, it is required that a damper be developed which can effectively prevent the galloping.

Conventionally, in order to prevent the galloping on the overhead transmission line, the transmission line has been strung so that the phase conductors thereof are largely spaced from each other. However, this has the disadvantage that the expenses are very high for construction of towers, due to the requirement of their sufficient height.

In another prior art arrangement, a line spacer has been used for preventing the galloping. The line spacer comprises an insulating rod or insulator and clamps on either side of the insulator to clamp the ends of the insulator to the conductors of the transmission line, so that it holds the distance between the phase conductors of the transmission line in a forced manner. However, this cannot be used for an extra-high voltage transmission line due to deterioration of insulation of the insulator.

SUMMARY OF THE INVENTION

Accordingly, it is a principal object of the present invention to provide a damper for an overhead transmission line adapted to effectively prevent a galloping.

It is another object of the present invention to provide a damper for an overhead transmission line adapted to be used even in case the transmission line has an extra-high voltage.

It is a further object of the present invention to provide a damper for an overhead transmission line constructed so that it can be strung without the requirement of a higher tower.

It is further object of the present invention to provide damper for an overhead transmission line having a simplified structure and capable of inexpensively being produced.

In accordance with the present invention, there is provided a damper for an overhead transmission line comprising a torsional bar disposed in a spaced and parallel arrangement with conductor means of an overhead transmission line; a fixture spacer to fix one of the ends of said torsional bar to said conductor means of said overhead transmission line; at least one bearing spacer to bear the other end of said torsional bar on said conductor means of said overhead transmission line so that said torsional bar is allowed to be twisted; and a pair of weights having an equal inertia moment and secured to said torsional bar adjacent to the torsional end and on either side thereof.

BRIEF DESCRIPTION OF THE DRAWINGS

FIG. 1 is a side elevational view of a damper according to the present invention, which is installed on a single conductor overhead transmission line;

FIG. 2 is a top view of the damper of FIG. 1;

FIG. 3 is a cross sectional view of the damper taken along the line III—III of FIG. 1;

FIG. 4 is a cross sectional view of the damper taken along the line IV—IV of FIG. 1;

FIG. 5 is a side view of a torsional bar with portions taken in section;

FIG. 6 is a top view of a damper according to the present invention, which is installed on a twin conductor overhead transmission line;

FIG. 7 is a right-handed side view of the damper of FIG. 6;

FIG. 8 is a left-handed side view of the damper of FIG. 6;

FIG. 9 is an enlarged front view of a portion of a bearing spacer used in the damper of FIGS. 6 to 8 to bear a torsional bar at the free end on the conductors of the transmission line;

FIG. 10 is a schematic diagram of a damper according to the present invention, which is installed on a quad conductor overhead transmission line;

FIG. 11 is an enlarged front view of a clamp to clamp the damper to the conductor of the transmission line in an insulated relation thereto;

FIG. 12 is an enlarged vertical view of a joint portion of the torsional bar;

FIG. 13 is an enlarged side view of a portion of a modified torsional bar with a portion taken in section;

FIG. 14 is a top view of another modification of a torsional bar;

FIG. 15 is a side elevational view of a modified bearing spacer, with a portion taken in section for the purpose of illustration;

DETAILED DESCRIPTION OF PREFERRED EMBODIMENTS OF THE INVENTION

Figure 16:
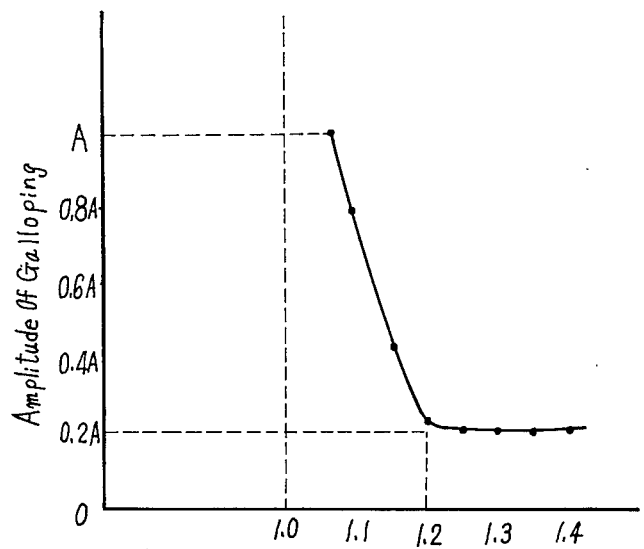
FIG. 16 shows the relation between a galloping amplitude and a ratio of a torsional vibration period to a vertical vibration period of the conductor of the overhead transmission line.

In order to develop a damper for an overhead transmission line to prevent a galloping on the transmission line, we made a test wherein a testing line with artificial ice and snow was blown by wind to cause a galloping. A principle of producing the galloping has been found from the result of the test. More particularly, it has been found that the galloping was produced on the transmission line while its own vertical vibration period and torsional vibration period have a close relation to each other. We found that when the conductor of the transmission line had ice and snow collecting thereon, the torsional and vertical vibration periods nearly equal each other to cause the galloping on the transmission line. We tried to examine the relation between them by changing a ratio of the torsional to the vertical vibration period to various values. As a result, we have found that a vibration amplitude of the galloping on the transmission line is extremely reduced when the torsional vibration period equals or is more than 1.2 times the vertical vibration period, resulting in prevention of the galloping on the overhead transmission line.

This invention has been made based on the above result of the test and has a feature of comprising a torsional bar having a length with one of the ends secured to the conductor or conductors of the transmission line and with the other end journalled on the conductor or conductors so that it is allowed to be twisted, and a pair of weights secured to the torsional bar adjacent to the free end whereby the torsional vibration period can vary.

Referring now to FIGS. 1 to 4, there is shown a damper for a single conductor overhead transmission line, which is indicated generally at numeral 1. This damper comprises a torsional bar 2 having a length and disposed in a closely spaced manner and parallel manner to a conductor 6 of a single conductor overhead transmission line, a fixture spacer 3 to fix one of the ends of the torsional bar 2 to the conductor 6, bearing spacers 4 to longitudinally spacedly bear the torsional bar 2 on the conductor 6 so that the other or free end of the torsional bar is allowed to be twisted, and a pair of weights 5 secured to the torsional bar adjacent to the free or torsional end and on either side thereof.

As shown in FIG. 5, the torsional bar 2 may comprise stranded metal wires 21 such as copper stranded wires or steel reinforced aluminium stranded wires and metal rod members 22 provided at the points of the spacers 3 and 4 to linearly connect the stranded metal wires 21 with each other or to terminate them. It will be noted that the stranded metal wires may be alternatively replaced by bundled metal wires. The rod members 22 may be compressively bonded to the stranded metal wires 21. As shown in FIG. 3, the fixture spacer 3 may be provided at both ends with a first clamp 31 to clamp the conductor 6 of the transmission line and a second clamp 32 to clamp the torsional bar 2 at one of the terminating rod members 22. The first clamp 31 may comprise a movable jaw 311 and a stationary jaw 312 hinged to each other; and the conductor 6 may be clamped by the jaws 311 and 312 bonded by a bolt 313. Similarly, the second clamp 32 may comprise a movable jaw 321 and a stationary jaw 322 hinged to each other; and the one terminating rod member 22 of the torsional bar 2 may be clamped by the jaws bonded by a bolt 323. The fixture spacer 3 may be composed of aluminium.

The bearing spacers 4 may each comprise a first clamp 41 to clamp the conductor 6 and a sleeve assembly 42 through which the torsional bar 2 extends. The first clamp 41 may comprise a movable jaw 411 and a stationary jaw 412 hinged to each other; and the conductor 6 may be clamped by the jaws bonded by a bolt 413. The sleeve assembly 42 may comprise two half members 421 and 422 each having a semicylindrical recess to complement each other to provide a cylindrical hole thereto; and the half members 421 and 422 may be assembled by bolts 423 and nuts 424. The cylindrical hole of the sleeve assembly 42 has an inside diameter slightly greater than an outside diameter of the rod members 22 of the torsional bar 2. Thus, it will be noted that the torsional bar 2 is allowed to be twisted about its fixed point by the fixture spacer 3. The bearing spacers may be also composed of auminium.

The pair of weights 5 may be preferably positioned as close as possible to the free end of the torsional bar 2. The weights are positioned on the opposite sides, respectivey, and secured to the other terminating rod member 22 of the torsional bar 2 by respective arms 51 which are in turn integrally secured at one of the ends to the weights 5 and at the other end to the rod member 22 of the torsional bar 2 by any suitable means such as a half clamp (not shown) having the construction similar to that of the sleeve assembly 42 afore-mentioned in connection with FIG. 4. It should be noted that the weights have respective inertia moments equaling each other on either side. Thus, the pair of the weights 5 are normally stationary because of balance between them, but when the conductor 6 of the overhead transmission line vibrates, they move accordingly with the result that the torsional bar 2 is twisted about its fixed point. It should be noted that the centers of gravity of the weights 5 may be preferably positioned below the axis of the torsional bar 2 for the purpose of stabilizing them. The weights may be preferably composed of iron.

It will be understood that the damper or dampers each having the afore-mentioned structure may be installed on the conductor 6 of the ovderhead transmission line between the adjacent towers in accordance with the span length.

It will be noted that spark unfavorably occurs at the point of the sleeve assemblies 42 of the damper 1 due to flow of current in a shunted manner through the torsional bar 2, which occurs because all the components of the damper are composed of metal materials. In order to prevent occurrence of such spark, the torsional bar 2 may be preferably supported on the conductor 6 of the overhead transmission line in an insulated manner from the same. By way of example, as shown in FIG. 11, the clamps 31 and 41 of the spacers 3 and 4 may clamp the conductor 6 with insulations such as insulating rubber rings 314 and 414 lined on the clamps so that they are inserted between the conductor 6 and the jaws of the clamps 3 and 4. Alternatively or in addition, as shown in FIG. 12, the rod members 22 of the torsional bar 2 may be secured to the stranded metal wires 21 with insulating tapes 23 wound around the wires so that they are interposed between the rod members 22 and the wires 21. In the illustrated embodiment of FIGS. 1 and 2, an armoring rod 61 may be preferably provided on that portion of the conductor 6 facing the weights so that it covers the conductor, for the purpose of preventing stress on the conductor 6 from concentrating at the portion thereof.

Figure 17:
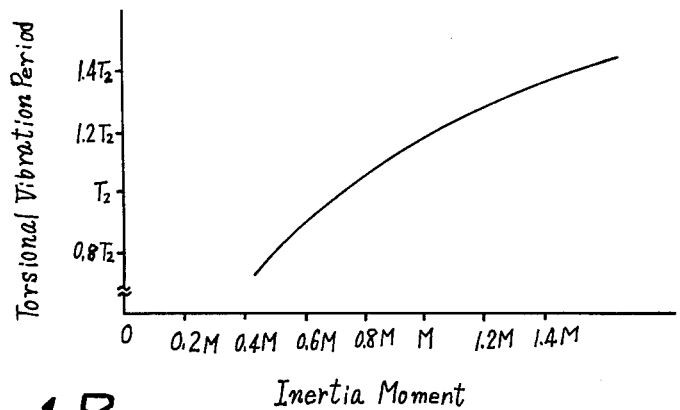
FIG. 17 shows the relation between a torsional vibration period of the conductor of the transmission line and an inertia moment of weights of the damper.
Figure 18:
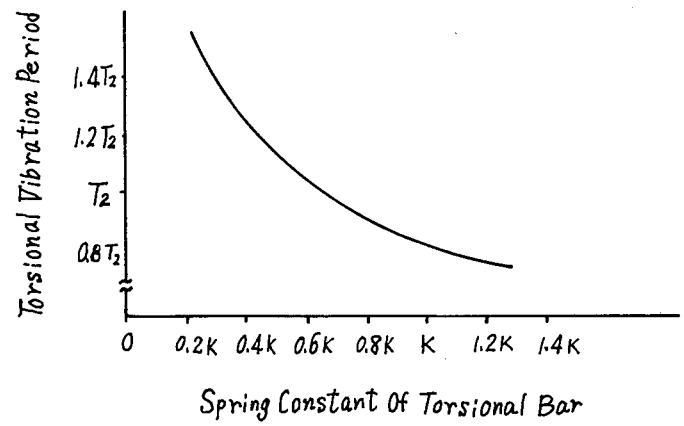
FIG. 18 shows the relation between a torsional vibration period and torsional spring constant of the torsional bar.

With the above damper or dampers of the present invention installed on the overhead transmission line, a torsional vibration period of the line can vary and thereby the torsional vibration period can be equal to or more than 1.2 times a vertical vibration period of the transmission line. More particularly, FIG. 17 shows the relation between the torsional vibration period of the conductor 6 and the inertia moment of the weights 5. It will be seen from this figure that the torsional vibration period increases accordingly with the inertia moment of the weights. FIG. 18 shows the relation between the torsional vibration period of the transmission line and a spring constant of the torsional bar 2. It will be seen from this figure that the less the spring constant of the torsional bar and the more torsible the torsional bar, the larger the torsional vibration period of the transmission line. Thus, it will be noted that the torsional vibration period of the conductor of the transmission line can increase and, therefore, time of the same can be elongated by properly determining and combining the values of the inertia moment of the weights 5 and the spring constant of the torsional bar 2. In this manner, the torsional vibration period of the conductor of the transmission line can be equal to or more than 1.2 times the vertical vibration period, with the result that the galloping on the transmission line can be effectively prevented.

According to our various test results, it has been found that if the length of the torsional bar 2 is 5m or more or less and the value of each of the weights 5 is 6 kg or more or less, the torsional vibration period of the transmission line can be 1.2 times the vertical vibration period and thereby the galloping can be prevented.

FIGS. 6 to 8 show a damper 101 of the present invention, which is installed on a twin conductor overhead transmission line. The damper 101 comprises a torsional bar 2, a fixture spacer 3, a bearing spacer 4 and a pair of weights 5, which may be substantially identical in construction to those of the afore-mentioned embodiment, except for installation of the torsional bar 2, the fixture spacer 3, the bearing spacer 4 and the weights 5. The fixture spacer 3 may comprise an arm 35, clamps 36 provided on both ends of the arm 35 to clamp two conductors 6 of the transmission line and a torsional bar clamping portion 37 provided at the middle of the arm 35, as shown in FIG. 7. The clamps 36 may each comprise two jaws 361 and 362 bonded by bolts; and the conductors 6 are clamped by respective clamps 36. The torsional bar clamping portion 37 may comprise a torsional bar receiving recess 371 and a cover 372 detachably secured to the arm 35 by bolts 373 to thereby clamp one of the ends of the torsional bar 2 between them.

As shown in FIGS. 8 and 9, the bearing spacer 4 may comprise a torsional bar receiving arm 45 having a recess 45a to receive the bar, two clamps 46 provided on both ends of the arm 45 and a cover 47 detachably secured to the arm by bolts 48 to loosely bear the torsional bar at the other or free end together with the recess 45a in the arm 45. As shown in FIG. 6, the bearing spacer 4 may preferably bear the terminating rod member 22 of the torsional bar 2, which is identical to that of the torsional bar of the afore-mentioned embodiment. The pair of weights 5 may be secured to the rod member 22 of the torsional bar 2 by two pairs of arcuate arms 52. Each of the pairs of arms 52 may comprise a clamp 521 provided at the middle of the arms to clamp the terminating rod member 22 of the torsional bar 2. Thus, in case the weights 5 rock, the torsional bar 2 is twisted about its fixed point. It will be noted that the reason for the arcuate configuration of the arms 52 is to prevent them from interference with the conductors 6 of the transmission line. With this arrangement of the damper 101 of FIGS. 6 to 8, the torsional vibration period can be changed so that the galloping on the transmission line is effectively prevented. It has been seen from our tests that it is preferable that the length of the torsional bar 2 is 3m or more or less and the value of each of the weights 5 is 20kg or more or less. It will be noted that the torsional bar 2 is borne only at the free end by a single bearing spacer 4 without bearing the middle of the bar, because it is relatively shorter.

FIG. 10 schematically shows a damper of the present invention, which is installed on a quad conductor overhead transmission line. The damper 201 may be substantially identical to those of the afore-mentioned embodiments and comprise a torsional bar 2 having a length, a fixture spacer 3 to fix one of the ends of the torsional bar 2 to the conductors 6 of the overhead transmission line, two bearing spacers 4 to loosely bear the other side of the torsional bar 2 on the conductors, and a pair of weights 5 secured to the torsional bar at the free end and having an inertia moment equaling each other of the weights 5. The fixture spacer 3 may comprise four clamps 31 to clamp the four conductors 6 of the transmission line and a clamp 32 provided at the center of the spacer 3 to clamp the torsional bar 2 so that it is fixed relative to the conductors. The bearing spacers 4 may each comprise four clamps 41 to clamp the conductors 6, and a sleeve assembly 42 provided at the center of the spacer 4 to bear the torsional bar 2 extending therethrough so that it is allowed to be twisted. The clamps of the spacers 3 and 4 and the sleeve assemblies 42 of the spacers 4 may be substantially identical in construction to those of the spacers of the afore-mentioned embodiments. Thus, in case the weights 5 are vibrated together with the conductors 6 of the transmission line, the torsional bar 2 is twisted accordingly whereby the torsional vibration period can vary to thereby prevent the galloping on the transmission line.

FIGS. 13 and 14 show modifications of the torsional bar 2. The torsional bar of FIG. 13 has the middle rod member 22 provided at both ends with flanges 221 and has flange members 211 compressively connected to the stranded wires at the connected end. The flanges 221 and the flange members 211 may be bonded each other by bolt and nut assemblies 222. The torsional bar 2 of FIG. 14 may comprise a single stranded metal wire 21 which may be provided with a plurality of rings 212 spaced each other along the axis of the torsional bar 2. The rings serve to prevent snow on the torsional bar 2 from moving along the strand of the bar to thereby restrain its growth. Thus, growth of snow is prevented so that it never adversely affects prevention of the galloping on the transmission line.

FIG. 15 shows a modification of the sleeve assembly 42 of the bearing spacer 4. The sleeve assembly 42 is required to always bear the torsional bar 2 without fixing the torsional bar 2 relative to the sleeve assembly due to freezing of water on the torsional bar. In order to prevent the torsional bar 2 from being fixed due to such freezing, the sleeve assembly of FIG. 15 may be preferably provided at both ends with bellows type covers 425 to prevent water on the torsional bar 2 from being intruded into the sleeve assembly. The covers 425 may be composed of flexible material such as rubber, plastics or the like. It will be noted that the torsional bar 2 is required to smoothly rotate or twist about its fixed point. For this purpose, the sleeve assembly 42 may be provided at both ends with bearings 426 to journal the torsional bar on the sleeve assembly.

While some preferred embodiments of the present invention have been described with reference to the accompanying drawings, it will be apparent, to those skilled in the art that they are by way of examples and that various changes and modifications may be made without departing from the spirit and scope of the present invention, which is intended to be defined only in the appended claims.

What is claimed is:

1. A damper for an overhead transmission line comprising a torsional bar disposed in a spaced and parallel arrangement with conductor means of an overhead transmission line; a fixture spacer fixing one of the ends of said torsional bar to said conductor means of said overhead transmission line; at least one bearing spacer loosely bearing the other end of said torsional bar on said conductor means of said overhead transmission line so that said torsional bar is allowed to be twisted; and a pair of weights having an equal inertia moment and secured to said torsional bar adjacent to the torsional end and on either side thereof.

2. A damper as set forth in claim 1, wherein a spring constant of said torsional bar and inertia moments of said weights are set so that a torsional vibration period of said conductor means of said overhead transmission line is equal to or more than 1.2 times a vertical vibration period of said conductor means of said overhead transmission line.

3. A damper as set forth in claim 1, wherein said torsional bar comprises a stranded metal wire.

4. A damper as set forth in claim 3, wherein said torsional bar is provided with a plurality of rings mounted thereon in a spaced manner along the longitudinal axis of said torsional bar.

5. A damper as set forth in claim 1, wherein said torsional bar comprises a bundle metal wire.

6. A damper as set forth in claim 1, wherein said torsional bar comprises a plurality of stranded metal wires and a plurality of metal rod members, some of which connect one of the adjacent stranded metal wires to the other, and the others of which are connected to the outermost stranded metal wires at the ends so as to terminate them, and wherein said fixture and bearing spacers are mounted on said metal rod members of said torsional bar.

7. A damper as set forth in claim 6 wherein said metal rod members are secured to said stranded metal wires, with flanges of said metal rod members bonded to flanges on said stranded metal wires.

8. A damper as set forth in claim 1, wherein said torsional bar comprises a plurality of bundled metal wires and a plurality of metal rod members, some of which connect one of the adjacent bundled metal wires to the other, and the others of which are connected to the outermost bundled metal wires at the ends so as to terminate them, and wherein said fixture and bearing spacers are mounted on said metal rod members of said torsional bar.

9. A damper as set forth in claim 8, wherein said metal rod members are secured to said bundled metal wires, with flanges on said metal rod members bonded to flanges on said bundled metal wires.

10. A damper as set forth in claim 1, wherein the centers of gravity of said weights are positioned below the axis of said torsional bar.

11. A damper as set forth in claim 1, wherein said torsional bar is insulated from said conductor means of said overhead transmission line.

12. A damper as set forth in claim 11, wherein said fixture and bearing spacers are provided with clamps to clamp said overhead transmission line, and wherein an insulation is inserted between each of said clamps of said spacers and said conductor means of said overhead transmission line.

13. A damper as set forth in claim 11, wherein said torsional bar comprises a plurality of stranded metal wires and a plurality of metal rod members, some of which connect one of the adjacent stranded metal wires to the other, and the others of which are connected to the outermost stranded metal wires at the ends so as to terminate them, wherein said fixture and bearing spacers are mounted on said metal rod members of said torsional bar, and wherein an insulation is inserted between each of said stranded metal wires and the corresponding metal rod member.

14. A damper as set forth in claim 11, wherein said torsional bar comprises a plurality of bundled metal wires and a plurality of metal rod members, some of which connect one of the adjacent bundled metal wires to the other, and the others of which are connected to the outermost bundled metal wires at the ends so as to terminate them, wherein said fixture and bearing spacers are mounted on said metal rod members of said torsional bar, and wherein an insulation is inserted between each of said bundled metal wires and the corresponding metal rod member.

15. A damper as set forth in claim 1, wherein said bearing spacer comprises a sleeve assembly through which said torsional bar extends so that it is allowed to be twisted and wherein flexible covers are provided at both ends of said sleeve assembly.

16. A damper as set forth in claim 15, wherein said sleeve assembly is provided at both ends with bearings to journal said torsional bar thereon.

* * * * *

UNITED STATES PATENT AND TRADEMARK OFFICE
CERTIFICATE OF CORRECTION

PATENT NO. : 3,941,914
DATED : March 2, 1976
INVENTOR(S) : Masanori Oishi; Harusige Koyanagi; Kazuo Matsumoto It is certified that error appears in the above-identified patent and that said Letters Patent are hereby corrected as shown below:

The inventors are five in number rather than three and include: Takao Ikeya of Nikko, Japan
and
Toshikazu Minyu of Tokyo, Japan Signed and Sealed this Tenth Day of August 1976

[SEAL]

Attest:

RUTH C. MASON
*Attesting Officer*

C. MARSHALL DANN
*Commissioner of Patents and Trademarks*